(12) United States Patent
Chaudhuri et al.

(10) Patent No.: US 7,493,337 B2
(45) Date of Patent: Feb. 17, 2009

(54) QUERY PROGRESS ESTIMATION

(75) Inventors: Surajit Chaudhuri, Redmond, WA (US); Vivek Narasayya, Redmond, WA (US); Ravishankar Ramamurthy, Madison, WI (US)

(73) Assignee: Microsoft Corporation, Redmond, WA (US)

( * ) Notice: Subject to any disclaimer, the term of this patent is extended or adjusted under 35 U.S.C. 154(b) by 476 days.

(21) Appl. No.: 10/813,963

(22) Filed: Mar. 31, 2004

(65) Prior Publication Data
US 2005/0222965 A1    Oct. 6, 2005

(51) Int. Cl.
G06F 7/00    (2006.01)
G06F 17/00    (2006.01)
G06F 17/30    (2006.01)
(52) U.S. Cl. ........................... 707/104.1; 707/2
(58) Field of Classification Search ............ 707/102, 707/10, 3, 104.1; 345/347
See application file for complete search history.

(56) References Cited

U.S. PATENT DOCUMENTS 6,301,580 B1 * 10/2001 Eigel-Danielson .......... 707/102
6,865,717 B2 * 3/2005 Wright ....................... 715/772

OTHER PUBLICATIONS

Ramakrishnan et al., "Database Management Systems", 3rd Edition, McGraw-Hill Press, 2003, pp. 404-409.*
Lezius et al., "TigerSearch Manual", University of Stuttgart, Apr. 5, 2002.*
Kabra et al., "Efficient Mid-Query Re-Optimization of Sub-Optimal Query Execution Plans", Proceedings of ACM SIGMOD, 1998.*
Aboulnaga, A., and Chaudhuri, S. *Self-Tuning Histograms: Building Histograms Without Looking at Data.* Proceedings of ACM SIGMOD 1999.
Antoshenkov, G. *Dynamic Query Optimization in Rdb/VMS.* Proceedings of IEEE JCDE 1993.
Dewitt, D., and Kabra, N. *Efficient Mid-Query Re-Optimization of Sub-Optimal Query Execution Plans.* Proceedings of ACM SIGMOD 1998.
Graefe, G. *Query Evaluation Techniques for Large Databases.* ACM Conput. Surv. 25(2): 73-170(1993).
Haas, P.J., and Hellerstein J.M. *Ripple Joins for Online Aggregation.* Proceedings of ACM SIGMOD, 1995.
Hans, P.J., Naughton, J.F., Seshadri, S., and Stokes L. *Sampling-based estimation of the number of distinct values of an attribute.* Proceedings of VLDB 1995.

(Continued)

Primary Examiner—Christian P. Chace
Assistant Examiner—Michael J Hicks

(57) ABSTRACT

A query progress indicator that provides an indication to a user of the progress of a query being executed on a database. The indication of the progress of the query allows the user to decide whether the query should be allowed to complete or should be aborted. One method that may be used to estimate the progress of a query that is being executed on a database defines a model of work performed during execution of a query. The total amount of work that will be performed during execution of the query is estimated according to the model. The amount of work performed at a given point during execution of the query is estimated according to the model. The progress of the query is estimated using the estimated amount of work at the given point in time and the estimated total amount of work. This estimated progress of query execution may be provided to the user.

43 Claims, 12 Drawing Sheets

OTHER PUBLICATIONS

Hellerstein, J.M., Haas, P.J., and Wang, H.J. *Online Aggregation*. Proceedings of ACM SIGMOD 1997.

Ioannidis, Y., and Christodoulakis, S. *On the propagation of errors in the size of join results*. Proceedings of ACM SIGMOD, 1991.

Ioannidis, Y., and Poosala. V. *Balancing Histogram Optimality and Practicality for Query Result Size Estimation*. Proceedings of ACM SIGMOD 1995.

Myers, B.A. *The Importance of Percent-Done Progress Indicators for Computer-Human Interfaces*. Proceedings of ACM SIGCHI 1985.

Stillger, M., Lohman, O., Markl, V., and Kandil, M. *LEO: DB2's LEarning Optimizer*. Proceedings of VLDB 2001, (CHI '00) (The Hague, The Netherlands, Apr. 1-6, 2000). ACM Press, New York, NY, 2000, 526-531.

* cited by examiner

QUERY PROGRESS ESTIMATION

FIELD OF THE INVENTION

The present invention concerns a method of estimating the progress of queries executed on a database.

BACKGROUND ART

Decision support queries can be expensive and long-running. Today's database systems do not provide feedback to a user, such as a database administrator (DBA), on how much of a query's execution has been completed. That is, today's database systems are not able to provide a "progress bar" that indicates how much of a query has executed and how much of a query remains to be executed.

While today's database management systems can provide much information about query execution at the end of the execution, typically the only information available during query execution is the number of output tuples generated thus far by the query, the execution plan for the query chosen by the optimizer at compile time, and the estimated cost and estimated cardinality of the query. However, this information is insufficient for reporting progress of query execution for the following reasons. The number of tuples output by a query at a given point during query execution does not provide an indication of what the total number of tuples output by the query will be. Moreover, for some queries, no tuple may be output until quite late in the query execution. Existing database systems include optimizers that use a cost model to compare different query evaluation plans. This cost model is not intended to be an accurate model of execution time. Optimizer estimates of cardinality are known to be susceptible to errors.

There is a need for a method of estimating query progress. For long running queries, running estimations of query progress would be very useful. For example, an indication of query progress would help the DBA decide whether the query should be terminated or allowed to run to completion.

SUMMARY

The present disclosure concerns a query progress indicator that provides an indication to a user of the progress of a query being executed on a database. The indication of the progress of the query allows the user to decide whether the query should be allowed to complete or should be aborted.

One method that may be used to estimate the progress of a query that is being executed on a database defines a model of work performed during execution of a query. The total amount of work that will be performed during execution of the query is estimated according to the model. The amount of work performed at a given point during execution of the query is estimated according to the model. The progress of the query is estimated using the estimated amount of work performed up to the given point and the estimated total amount of work. This estimated progress of query execution can be provided to the user.

The work performed during execution of the query may be modeled in a variety of ways. For example, work performed during execution of a query could be modeled as a number items returned, such as tuples or groups returned, or a number of GetNext( ) calls. In one embodiment, the work performed during execution of the query is approximated as the work performed by a subset of operators of the query. For example, the work performed during execution of the query could be modeled as work performed by one or more driver node operators during execution of the query.

In one embodiment, a query execution plan is divided into a set of pipelines, the progress of each pipeline is estimated, and the estimates from the pipelines are combined and returned as the progress of the query. The pipelines comprise sequences of non-blocking operators. In one embodiment, the total amount of work that will be performed by a pipeline is initialized with an estimate from a query optimizer or another source.

In one embodiment, the initial estimate of total work is be refined using feedback obtained during query execution. For example, the total work can be refined by maintaining upper and lower bounds on the total work that will be performed. The initial estimate is then refined when it violates the upper or lower bound. Upper and lower bounds may be maintained for each of the operators in each pipeline with bound defining rules for each different type of operator. In one embodiment, the upper and lower bounds are defined in terms of a number of items returned so far by the query operator, the number of items returned so far by one or more preceding query operators, and/or the upper and/or lower bounds of one or more preceding operators. In one embodiment, changes in bounds of query operators are periodically propagated up the query execution plan to allow the bounds of following query operators in the execution plan to be updated.

In one embodiment, driver node operators are identified for each pipeline. In this embodiment, the work performed during execution of the pipelines is modeled as work performed by the driver node operators. In one embodiment, weights are assigned to the pipelines that make up the query. These weights may be based on relative execution rates of the pipelines.

In one embodiment, the method identifies a spill of tuples to disk during query execution. The model of work may be adjusted to account for additional work that results from the spill of tuples and/or an indicator may be provided that alerts the user that the spill has occurred.

In one embodiment, computer readable instructions for performing a method for estimating query progress are stored on computer readable media. The computer readable instructions can be stored in a memory of a system for providing an indication of query progress. Such a system includes a user input device, a display, a data content, and a processor. The user input device enables a user to begin execution of a query and abort execution of a query. The processor is coupled to the user input device, to the display, to the data content, and to the memory. The processor executes the machine instructions to execute a query upon the data content, monitor progress of the query, and provide an indicator of query progress on the display. In one embodiment, the query progress indicator provides a visual indication of a percentage of query execution that has been completed. In one embodiment, decreasing progress estimations are prevented from being displayed.

These and other objects, advantages, and features of an exemplary embodiment are described in conjunction with the accompanying drawings.

DETAILED DESCRIPTION

Query Progress Indicator

Figure 1:
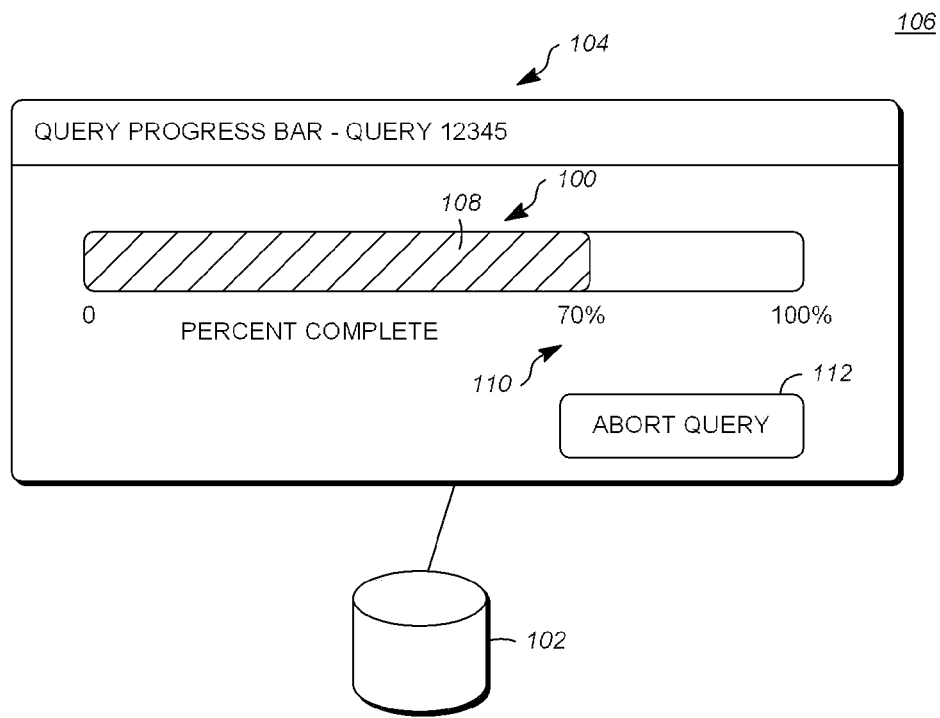
FIG. 1 is a schematic representation of a database query progress indicator.

FIG. 1 illustrates an example of a progress indicator 100 that provides an indication to a user of the progress of a query being executed on a database 102. The illustrated progress indicator 100 forms part of a user interface 104 of a database system 106. The illustrated progress indicator 100 includes a progress bar 108 and a numeric representation 110 of query progress. The illustrated user interface 104 includes a user input button 112 that facilitates aborting of the query.

Figure 2:
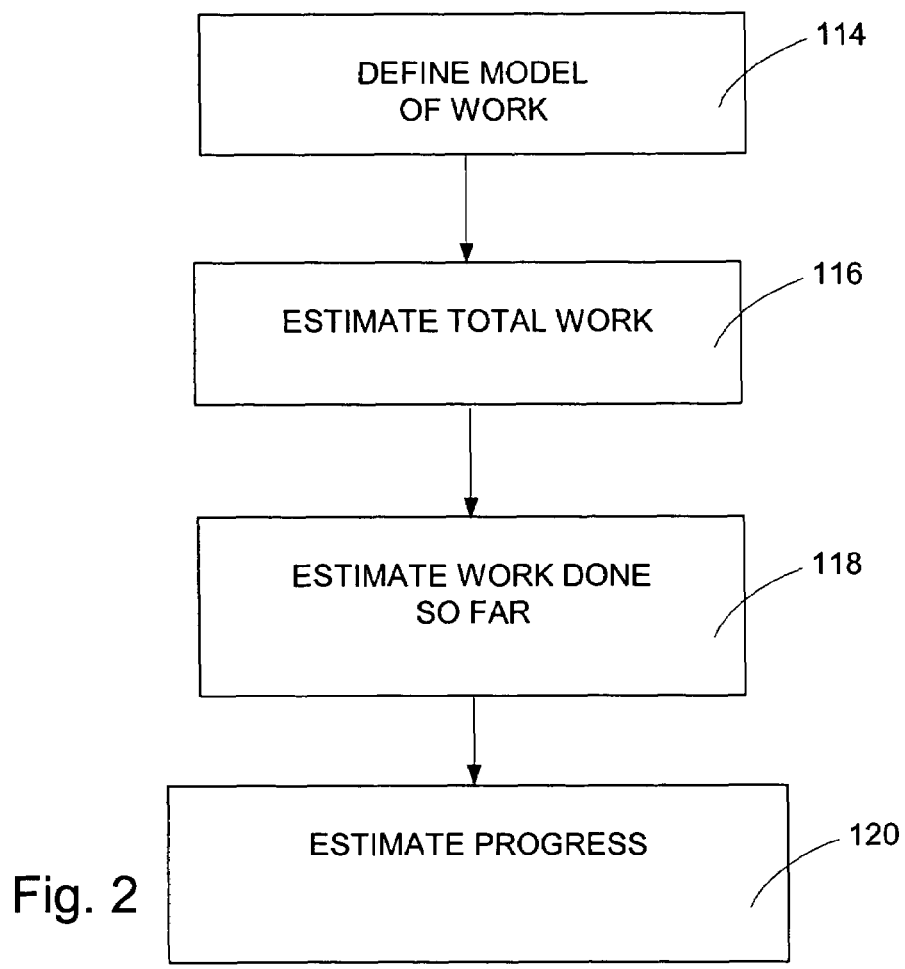
FIG. 2 is a flow chart that illustrates a method of estimating query progress.

FIG. 2 is a flow chart that illustrates one method that can be used to estimate query. In this method, a model of work performed during query execution is defined 114. The total amount of work that will be performed during execution of the query is estimated 116 according to the model. The amount of work performed at a given or current point during execution of the query is estimated 118. The progress of the query is estimated 120 using the estimated amount performed at the given point and the estimated total amount of work. For example, the query progress is expressed as the estimated work performed up to the current point of execution divided by the estimated total work that will be performed during query execution.

In the method illustrated by FIG. 2, query progress is reported in terms of work done in executing a query, rather than an amount of time left for the query to complete execution. Reporting the amount of time left for a query to complete execution requires modeling of runtime issues, such as time variations due to executing concurrent queries, caching, disk rates etc. These runtime issues make estimating the amount of time for a query to complete execution difficult. In the embodiment illustrated by FIG. 2, the direct influence of runtime issues is isolated by estimating what percentage of the total work of the query is completed at any instant, rather than estimating the amount of time that is required for the query to complete execution.

In the embodiment illustrated by FIG. 1, query progress is presented as a single number or progress bar. Using a single number or progress bar to report the progress estimation is a paradigm that users are already familiar that is easy to understand/interpret. In another embodiment multiple progress estimation numbers or bars are presented for a query. For example, the progress of each node of a query execution plan can be presented.

Model of Work

Query progress estimation is difficult in its most general setting. Database systems can have widely fluctuating runtime conditions. This makes it difficult to develop a model of work that can be used to accurately model query execution time. In an exemplary embodiment, work W is modeled as a number of items, such as tuples or groups, returned by one or more query operators. In this application, query operators refers to physical operators in a query execution plan. This measure of work is independent of time and is invariant across query runs.

Figure 3:
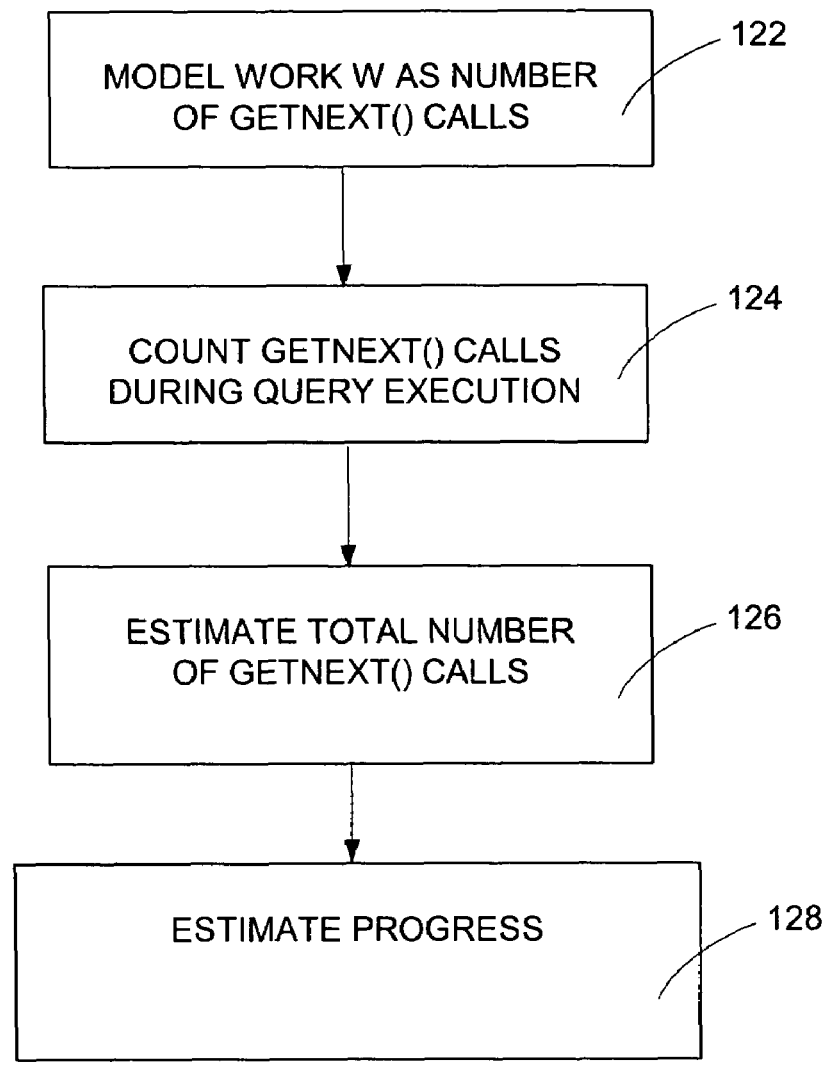
FIG. 3 is a flow chart that illustrates a method of estimating query progress.

In one embodiment, the model of work is based on the observation that in most existing database systems, query operators are usually implemented using an iterator model. In the iterator model, each physical query operator in the query execution plan exports a standard interface for query processing. The operators in this interface include Open( ), Close( ) and GetNext( ) calls. Each time a GetNext( ) operator is issued an item, such as a tuple or group is returned. Referring to FIG. 3, the work W is modeled 122 as the total number of GetNext( ) calls issued throughout the query pipeline including the root in one embodiment. The method counts 124 each GetNext( ) call K as a primitive operation of query processing and models 126 the total work done by the query as the total number N of GetNext( ) calls. Query progress is then estimated 128 by dividing the GetNext( ) count by the estimated total number of GetNext( ) operators.

This model though simple has a number of advantages. This model can be applied to any SQL query as most modern database system do employ a demand driven model for query evaluation. This measure of work is invariant across multiple query runs. It is simple and hence can easily be analyzed.

Difficulties Associated with Estimating Total Number of GetNext Calls

The total number N of GetNext( ) calls that will be issued during query execution is not known until execution is complete. In an exemplary embodiment, the model of work W based on GetNext( ) calls is refined to ensure that an estimator E is within a constant factor of an ideal estimator I.

At any point during execution, if the current number of GetNext( ) calls issued anywhere in the pipeline is a number k and the total number of GetNext( ) calls is a number N, the progress can be reported as a fraction (k/N). An ideal estimator I is one which has complete knowledge of the results of the query. Such an estimator would know the exact total number of GetNext( ) calls N and hence would predict progress accurately.

At any given point in time, estimator E would have observed the execution until this given point and hence can compute the exact number k of GetNext( ) calls executed so far. The estimator E functions in an 'online' fashion in that it predicts a value for the total number of GetNext( ) calls N at every instant. To limit overhead, available to help the estimator E predict the total number of GetNext( ) calls N are limited in the exemplary embodiment. For instance, estimator E could obtain the exact value of the number of GetNext( ) calls N by executing the query, but the cost is prohibitive. As such, in an exemplary embodiment, estimator E method is limited to the class of estimators that obey the following restrictions.

1) The estimator E can access any information it has observed so far in the query evaluation. For example, the output of any operators in the execution tree.
2) The estimator E can use any available statistics that have been pre-computed by the database system.

Given this class of estimators E, it is difficult to construct an estimator E such that the estimator E is guaranteed to always to estimate progress within a constant factor of the ideal estimator I. As an example, consider a database containing the following relations.

1. Relation A having a column v which has M elements chosen from the set {1, 2 . . . n} with each element occurring at-most once (M<=n).

2. Relation B having column v. where B=∪Bi (i=1 . . . n) where each Bi={i, i, . . . i} having N elements (column v all with the value i) where N≧$c^2$*M (c is a constant).

Figure 4:
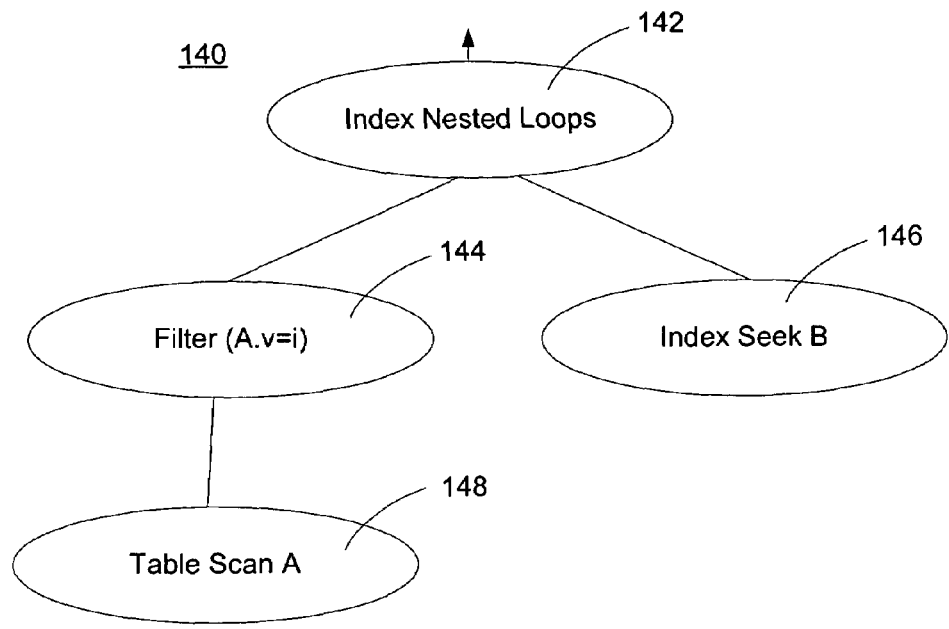
FIG. 4 is an illustration of a query execution plan.

Thus the size of the database in this example is no more than $n^2$, denoted $O(n^2)$. FIG. 4 illustrates an example of an execution plan for a query that joins 142 relation A with relation B on column v, and imposes 144a filter on A (A.v=i). An example of an execution plan 140 for this query is shown in FIG. 4. Assume an adversary exists that is free to re-order the tuples of table A during query execution, and consider a point in time during query execution when k tuples from A have been scanned. Assume an estimator E exists is guaranteed to always be within a constant factor c of the ideal estimator I. Let the exact total number of GetNext( ) calls that will be made for this query be D (thus I=k/D). Then:

$$\frac{1}{c} \cdot \frac{k}{D} \leq E \leq c \cdot \frac{k}{D}, \text{ or equivalently } \frac{1}{c} \cdot \frac{k}{E} \leq D \leq c \cdot \frac{k}{E}$$

There are two possible values for D based on whether or not the value i is actually present in column A.v.

Case 1: If the value i is present in A.v, then D=M+N+1 since the total number of GetNext( ) calls would include M for Table Scan of A, exactly one from the Filter node and N from the Join node). Since N≧$c^2$.M, it follows that D>$c^2$.M. Since k/E≧D/c, k/E>c*M Case 2: If the value i is not present in A.v then D=M (no tuple would flow out of the filter and join nodes). In this case, since D=M, and it follows that k/E≦c*M.

Thus, the estimator E (after seeing k tuples of table A) by comparing the value of k/E to c*M can say with absolute certainty whether or not the tuple i is present in relation A. Since the adversary is free to reorder the tuples, it can be assumed with generality that tuple i is not among the k tuples scanned so far. So the only way estimator E can conclude that tuple i belongs to relation A is by obtaining this information from the statistics pre-computed by the database system. It is possible that the database may have pre-computed accurate statistics for certain queries (some tuple i values in the example). However, unless the database has pre-computed at least n bits, denoted Ω(n) bits, there would always exist some tuples i for which the estimator E is not within a constant factor of I. Thus, it is difficult to approximate the total number of GetNext( ) calls.

Progress Estimation of Single Execution Pipelines

In one embodiment, an estimator PROG estimates the progress of a query whose execution plan is a single pipeline by dividing the number $k_i$ GetNext( ) calls by a first operator $OP_i$ are a given point in time by an estimated total number $N_i$ GetNext( ) calls by operator $OP_i$. A pipeline is a sequence of non-blocking operators. For example, the query execution plan 140 illustrated by FIG. 4 is a single pipeline, because the Index Nested Loops Join 142, the Filter 144, the Index seek 146, and the Table Scan 148 are all non-blocking operators. For the sub-class of queries whose execution plan is a single pipeline, estimator PROG is within a constant factor of the ideal estimate I.

Consider the class of queries whose execution plan is a single pipeline consisting of m operators: $Op_1 \rightarrow Op_2 \ldots \rightarrow Op_m$. Typically, such a pipeline consists of unary physical operators. The only join operator that can execute within a single pipeline is the Index Nested Loops (INL) join since both the Hash Join and Sort-Merge Join are blocking.

Let the total number of tuples that flow out of operator $Op_i$ at the end of query execution be $N_i$ (i=1 . . . m). At any point during query execution, let the number of tuples that have flowed out of every operator (i.e. number of GetNext( ) calls invoked at that operator) be $K_i$ (i=1 . . . m). Now, consider pipelines in which at any point of time $K_i \geq K_{i+1}$. In other words, no operator in the pipeline can increase its incoming cardinality. Such a pipeline is referred to as a monotonically decreasing pipeline. Note that this also implies that $N_i \geq N_{i+1}$. Examples of physical operators that could be part of a monotonically decreasing pipeline are table scans, filter operators and streaming aggregates. The Index Nested Loops Join would also satisfy the above property when the join looks up a key value (i.e. foreign key—key join). For the class of monotonically decreasing pipelines, the disclosed method utilizes an estimator PROG that is within a factor m of the ideal estimator I.

If operator $Op_1$ is either a table scan operator or an index scan operator, then the ideal estimator I would predict the progress as:

$$I = \frac{\sum_i K_i}{\sum_i N_i}$$

The estimator has exact information on the numbers of tuples $K_i$'s that have flowed out of every operator so far (which can be observed from query execution) and also information on the total number of tuples $N_1$ to be returned by the operator $Op_1$. The total number of tuples $N_i$ returned by operator $Op_1$ is known since cardinality estimates for a table scan or an index scan are typically accurate. The only other operator that could be operator $Op_1$ for a query whose execution pipeline is a single pipeline is the Index Seek operator. Estimating the total number of tuples $N_1$ for an Index Seek operator $Op_1$ is discussed below.

Accurately estimating the rest of the numbers $N_i$'s of tuples returned by other types of operators is challenging. Consider two estimators $E_1$, $E_2$, each of which uses information that is known to be accurate and provides estimates that are within a constant factor of the ideal estimator I for the class of monotonically decreasing single pipeline queries. Estimator $E_1$ is a pessimistic estimator which would always under-predict the progress. Estimator $E_2$ is an optimistic estimator that always over-predicts the progress. Estimators $E_1$ and $E_2$ are defined as follows:

$$\text{Estimator } E_1: E_1 = \frac{\sum_i Ki}{N_1 \cdot m}$$

Where $N_1$ is the number of tuples that flow out of operator $Op_1$ (the first operator in the pipeline), and m is the number of operators in the pipeline.

Claim: For monotonically decreasing pipelines $E_1$ is a lower bound on I within a factor m.

Proof: $E_1/I = \Sigma_i N_i/(N_1 * m)$. Since, the pipeline is guaranteed to be monotonically decreasing we know that $N_1 \leq \Sigma_i N_i \leq m \cdot N_1$. In other words:

$1/m \leq E_1/I \leq 1$ or equivalently:

$$I \cdot \frac{1}{m} \leq E_1 \leq I \quad (1)$$

Hence estimator $E_1$ is always a lower bound of I within a factor m of the number of operators m in the pipeline.

$$\text{Estimator } E_2: E_2 = \frac{\sum_{i=1}^{m} Ki}{N_1 + \sum_{i=2}^{m} Ki}$$

Claim: For monotonically decreasing pipelines $E_2$ is an upper bound on I within a factor m.

$$\text{Proof: } \frac{E_2}{I} = \frac{\sum_i N_i}{\sum_i N_i + \sum_{i=2}^{k} K_i}$$

We know that:

$$\left(N_1 + \sum_{i=2}^{m} Ki\right) \leq \sum_i Ni \leq m \cdot \left(N_1 + \sum_{i=2}^{m} Ki\right)$$

in other words we have $1 \leq E_2/I \leq m$, or equivalently, $$I \leq E_2 \leq m \cdot I \quad (2)$$

Hence estimator $E_2$ is always an upper bound of I within a factor m. m is the number of operators m in the pipeline.

In an exemplary embodiment, a progress estimator PROG estimates progress of the entire pipeline by just observing the progress of the first operator $Op_1$. The progress estimator PROG estimates always lie between the estimates of $E_1$ and $E_2$ for the case of monotonically decreasing pipelines. As a result, estimator PROG approximates the ideal estimator I within a factor m (m is the number of operators in the pipeline). Even for the general class of all queries that execute in a single pipeline, the progress estimator PROG performs well in many conditions.

Figure 5:
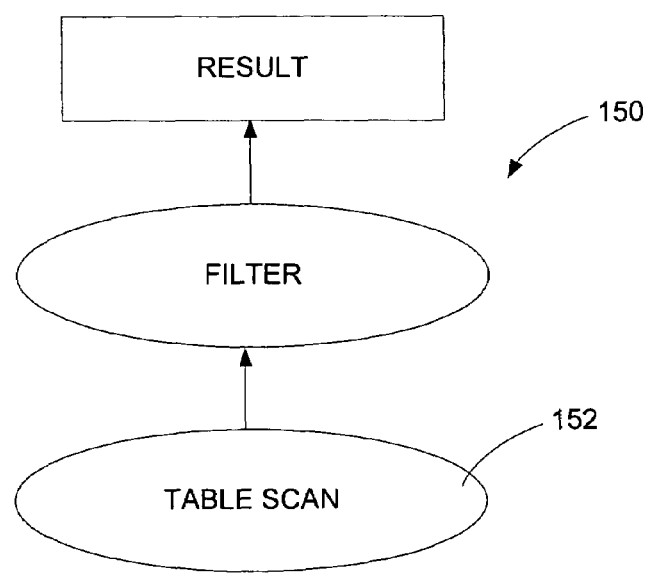
FIG. 5 is an illustration of a query execution plan.

Referring to FIG. 5, the estimator PROG is based on the assumption that a pipeline 150 is "driven" by the first operator 152 (i.e., the leaf node of the pipeline), which is referred to herein as a driver node in the pipeline. In other words, the estimator PROG approximates the progress of the overall pipeline as equivalent to the progress of the scan of the corresponding driver node of the pipeline. Thus:

$$PROG = \frac{K_1}{N_1}$$

Claim: For monotonically decreasing pipelines, PROG always lies between estimators $E_1$ and $E_2$.

Proof: Compare PROG to the estimators $E_1$ and $E_2$ defined above.

$$(PROG - E_1) = \frac{K_1}{N_1} - \frac{\sum_i Ki}{m \cdot N_1}.$$

Cross multiplying, $$(PROG - E_1) = \frac{N_1 \cdot m \cdot K_1 - N_1 \cdot (K_1 + K_2 + \ldots K_m)}{N_1 \cdot m \cdot N_1}$$

Since the pipeline is monotonically decreasing, $m \cdot K_1 \geq (K_1 + K_2 + \ldots K_m)$. Therefore, $(PROG - E_1) \geq 0$ or $PROG \geq E_1$.

From the definition of $E_2$:

$$E_2 = \frac{K_1 + \sum_{i=2}^{m} Ki}{N_1 + \sum_{i=2}^{m} Ki}$$

and since $\sum_{i=2}^{m} K_i \geq 0$, $E_2 \geq PROG$.

Thus, $E_1 \leq PROG \leq E_2$. Using Equations (1) and (2) above:

$$\frac{I}{m} \leq E_1 \leq PROG \leq E_2 \leq m \cdot I$$

Thus for a pipeline that is monotonically decreasing, estimator PROG is always within a constant factor m of the ideal estimator I. The constant m is related to the number of operators in the pipeline. If a node other than the 'driver' node is used to monitor progress (some other operator $Op_j$), then the corresponding total value $N_j$ needs to be predicted at every instant. One advantage of using estimator PROG is the fact that both $K_1$ and $N_1$ are exact values when operator $Op_j$ is a table scan or an index scan. This reduces uncertainty and is likely to make the estimator more robust.

Extending Estimator PROG

In one embodiment, the PROG estimator is used for the case of single pipelines that are not necessarily limited to monotonically decreasing pipelines. In one embodiment, the PROG estimator is used for the case where the leaf node is not limited to a table scan or an index scan. Situations under which the estimator PROG is an accurate estimator are characterized below.

In one embodiment, the PROG estimator is used to estimate the progress of general queries with execution plans that are a single pipeline. Estimator PROG is accurate for the general case of single pipelines. Consider the entire pipeline as a black box. Assume that the input to the pipeline consists of n tuples. Let $C_j$ denote the total work done by the pipeline on tuple j. Then an accurate definition of the progress at any point after k tuples have been processed by the pipeline is:

$$E = \frac{\sum_{j=1}^{k} Cj}{\sum_{j=1}^{n} Cj}$$

Let C' denote the average work per tuple for the k tuples processed so far, and let C" denote the average work per tuple for the remaining (n-k) tuples that have not yet been processed by the pipeline. The estimator PROG would predict the progress at any instant as k/n. Note that:

$$E = \frac{k \cdot C'}{k \cdot C' + (n-k) \cdot C''}$$

which is identical to PROG if C'=C". In other words, if the average work per tuple processed so far is approximately equal to the average cost per tuple of the remaining tuples, the heuristic estimator PROG is accurate even for execution pipelines that are not monotonically decreasing.

To this point in the disclosure, it has been assumed that the driver operator $Op_1$ is a Table scan or an Index scan. When the query executes, the only other possibility is that the leaf node is an Index Seek. In this case the value $N_1$ used for the driver node is no longer guaranteed to be an exact value. There could certainly be cases in which the optimizer estimate for $N_1$ is very accurate. For instance a histogram could exist on the predicate column and the predicate could match the bucket boundaries or the predicate value could be based on one the values stored in an end biased histogram. However, the optimizer estimate for an Index Seek could be inaccurate. In one embodiment, the method relies on the optimizer for the initial estimate of value $N_1$, but this estimate is refined based on execution feedback. It should be readily apparent that the initial estimate of value $N_1$ can be obtained from a source other than the optimizer. In one embodiment, the method maintains upper bounds and lower bounds of expected cardinality estimates at any point during query execution. The method then refines the estimate of value $N_1$ if it does not lie within these bounds.

Progress Estimation of Arbitrary Query Plans

Figure 6:
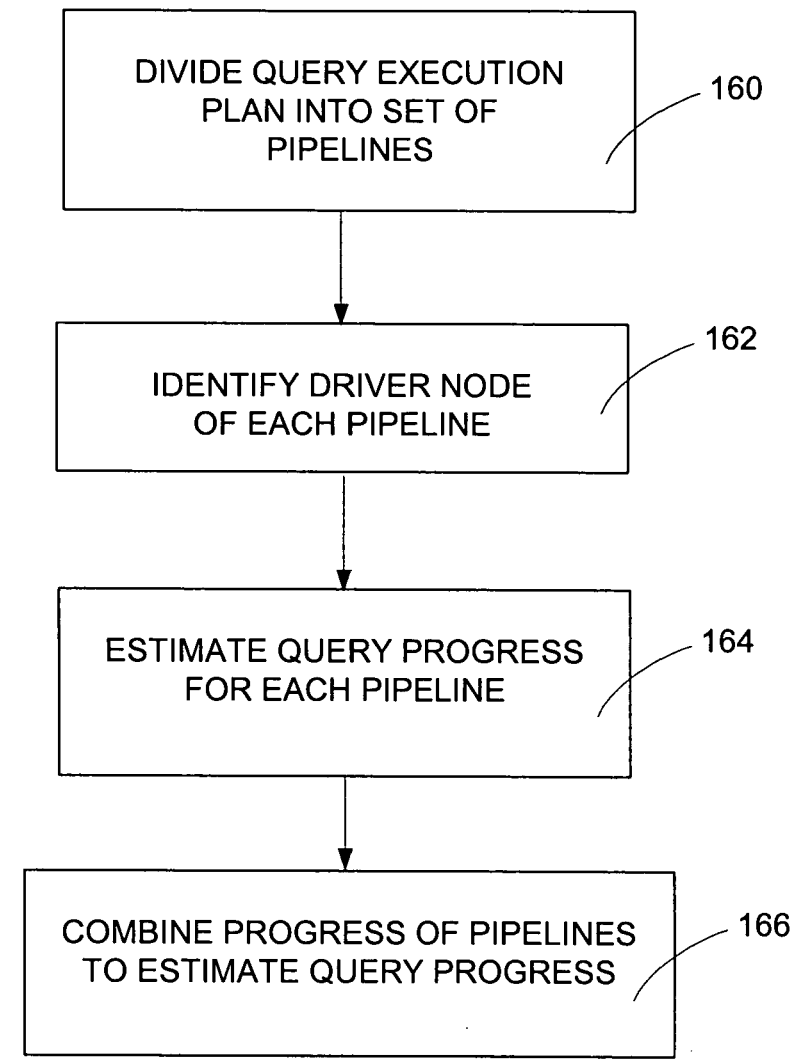
FIG. 6 is a flow chart that illustrates a method of estimating query progress.

The method illustrated by FIG. 6 extends to arbitrary query execution plans that include multiple pipelines. One method that estimates the progress of queries with execution plans that include multiple pipelines is illustrated by FIG. 6. In the embodiment illustrated by FIG. 6, the query's execution plan is divided 160 into a set of pipelines. The driver node is identified 162 for each pipeline. Query progress is estimated 164 for each pipeline. The progress of the pipelines is combined 166 to estimate progress of the query.

The method illustrated by FIG. 6 is based on the observation that any query execution plan can be viewed as a set of pipelines. Each pipeline can be approximated as a scan of one or more 'driver' nodes. By monitoring what percentage of the work done at each driver node is complete, the disclosed method can estimate the overall progress of the query during execution.

The method models an arbitrary execution plan as a set of single pipelines and uses estimator PROG for each individual pipeline in an exemplary embodiment. In one embodiment, the method for estimating query progress: (1) defines how to combine estimators for individual pipelines to obtain an estimator for the overall execution plan, (2) identifies pipelines and driver node(s) for each pipeline and initializes the cardinality of each pipeline and (3) refines the cardinality estimates of the driver nodes during query execution.

Combining Estimators of Individual Pipelines

Given an execution plan, the disclosed method models the query execution plan as a set of pipelines, and approximates each pipeline as a scan of one or more driver nodes. In an exemplary embodiment, the method levies the idea that the total work done is the sum of the work done in individual pipelines. Consider an execution plan in which there are a total of d driver nodes, and suppose the number of tuples that flow out of these nodes (i.e. number of GetNext( ) calls invoked on that node) at the end of query execution are $N_1 \ldots N_d$. If we assume each pipeline proceeds at approximately the same rate, then the estimator PROG can be generalized for the entire query plan as follows:

$$PROG = \frac{\sum_{i=1}^{d} K_i}{\sum_{i=1}^{d} N_i}$$

where $K_i$'s denote the current state (number of tuples processed) of the corresponding driver nodes during query execution.

In one embodiment, the progress estimator PROG uses the total number of rows observed thus far by all the nodes of the pipeline (denoted $K_{total}$) and an estimated total number of rows that will be returned by all the nodes of the pipeline (denoted $N_{total}$). The total number $K_{total}$ of rows observed thus far can be observed during execution of the query. The following example illustrates one way that the total number $N_{total}$ of rows that will be returned can be estimated. Let $K_d$ be the number of rows observed thus far for the driver nodes of the pipeline. In the example, Let $N_d$ be the number of rows estimated for the driver nodes of the pipeline. Let $K_d/N_d=f$, where f denotes the estimated progress using driver nodes observed at any point during the query's execution. Using a hypothesis that progress estimation using the driver nodes is an accurate estimation of the progress of all the nodes, let $K_d/N_d=K_{total}/N_{total}$. From this, it follows that $K_{total}/N_{total}=f$. Therefore at any point during the query's execution, we can estimate $N_{total}=K_{total}/f$. Thus the overall estimator PROG can be written as:

PROG=$K_{total}$ (summed up over all pipelines in the tree)/$N_{total}$ (summed up over all pipelines in the tree) where $N_{total}$ for each pipeline is estimated as described above.

It should be readily apparent that a variety of other strategies could be employed to estimate total number $N_{total}$ of rows that will be returned.

Identifying Pipelines and Driver Nodes

Figure 7:
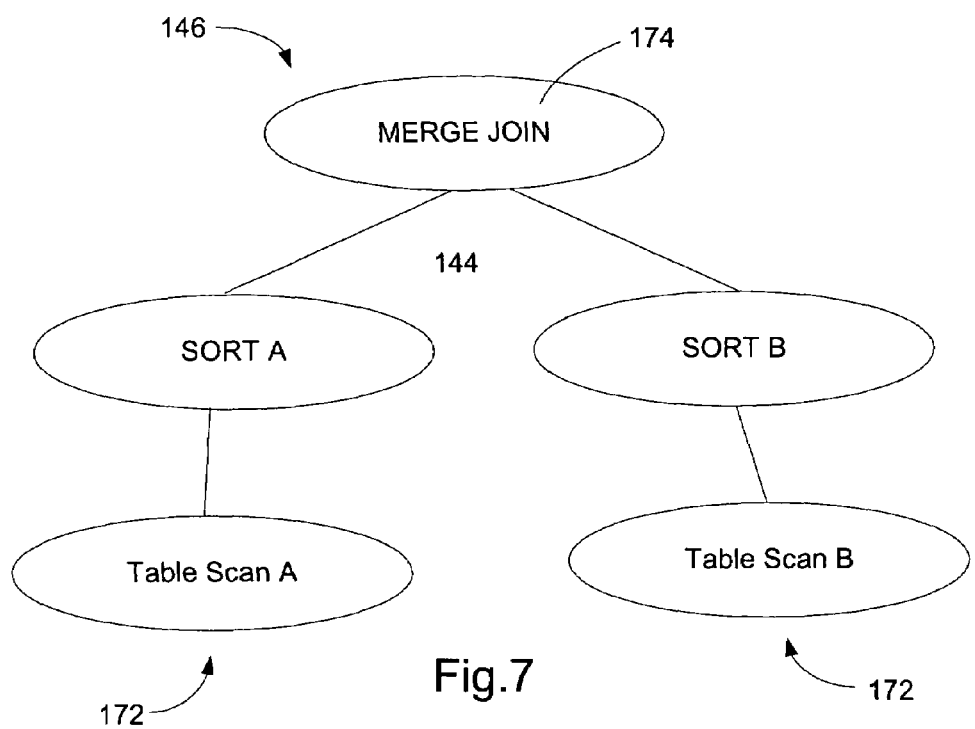
FIG. 7 is an illustration of a query execution plan.

Given a starting node of a pipeline, the pipeline is defined as the longest sequence of non-blocking operators from the starting node. Thus all nodes in a pipeline execute together. Of course, the determination of whether or not a node (i.e., physical operator) is blocking depends on the specific operator. For example, an Index Nested Loops join is non-blocking, whereas a Hash Join is blocking. Given an execution plan, the method generates the corresponding set of pipelines by traversing the nodes of the tree in post order and accumulating pipelines using multiple stacks. Referring to FIGS. 5 and 7, given an execution plan, there are two possible kinds of pipelines. FIG. 5 shows a first type of pipeline 150 that is a linear chain of nodes in which there is a unique leaf node 152 that is picked as the driver. Referring to FIG. 7, another possible pipeline comprises multiple input nodes 172 feeding into a single node 174. In the example of FIG. 7, this single node 174 Merge node in a Sort-Merge Join. In this case, all the leaf nodes would be considered driver nodes. When the execution plan of the query is not a single pipeline, the driver nodes are not limited to Table Scan, Index Scan and Index Seek operators. The following examples illustrate some sample execution plans and the corresponding driver nodes.

Figure 8:
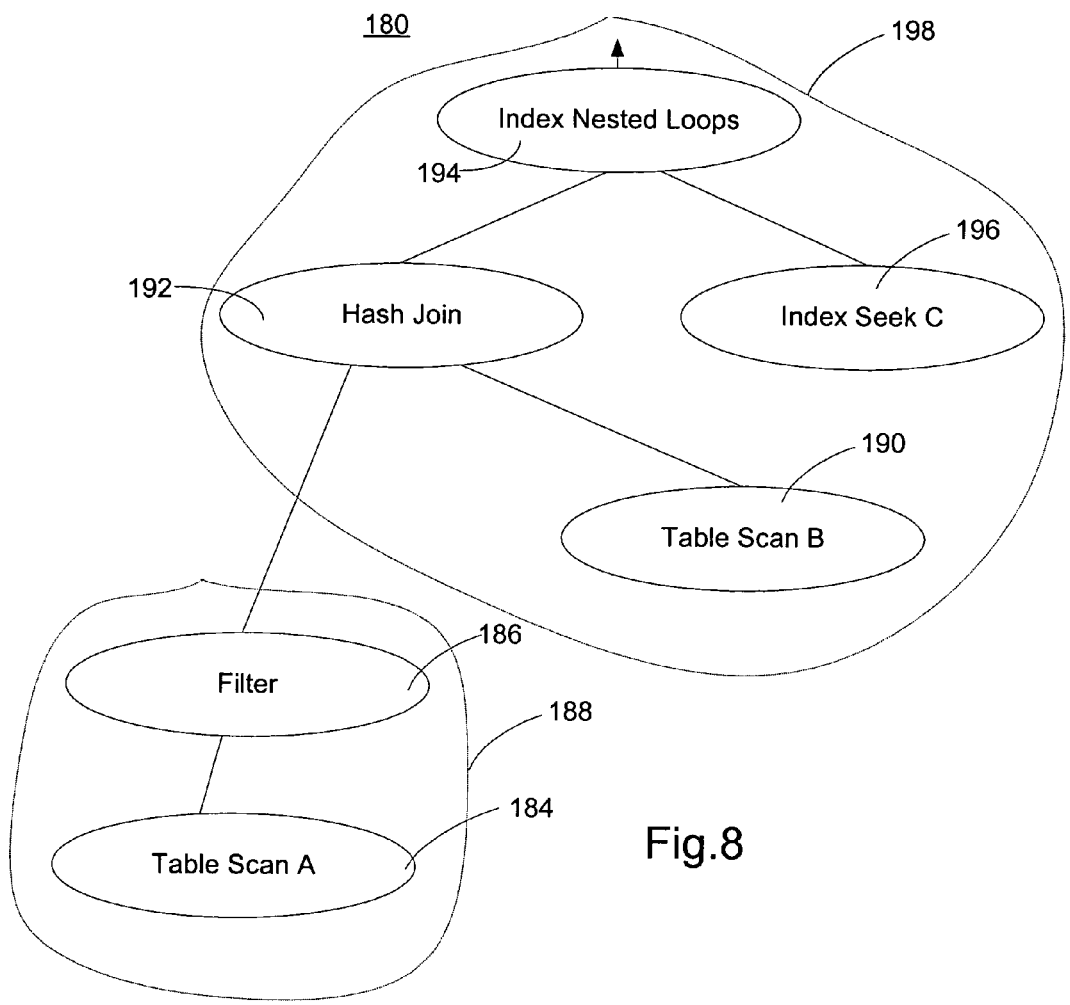
FIG. 8 is an illustration of a query execution plan.

FIG. 8 illustrates dividing a query execution plan 180 into pipelines. Assuming that A is the build side of the Hash Join 182 and B is the probe side, the pipelines are: {Table Scan A 184, Filter 186} 188, {Table Scan B 190, Hash Join 192, Index Nested Loops 194, Index Seek C 196} 198.

Figure 9:
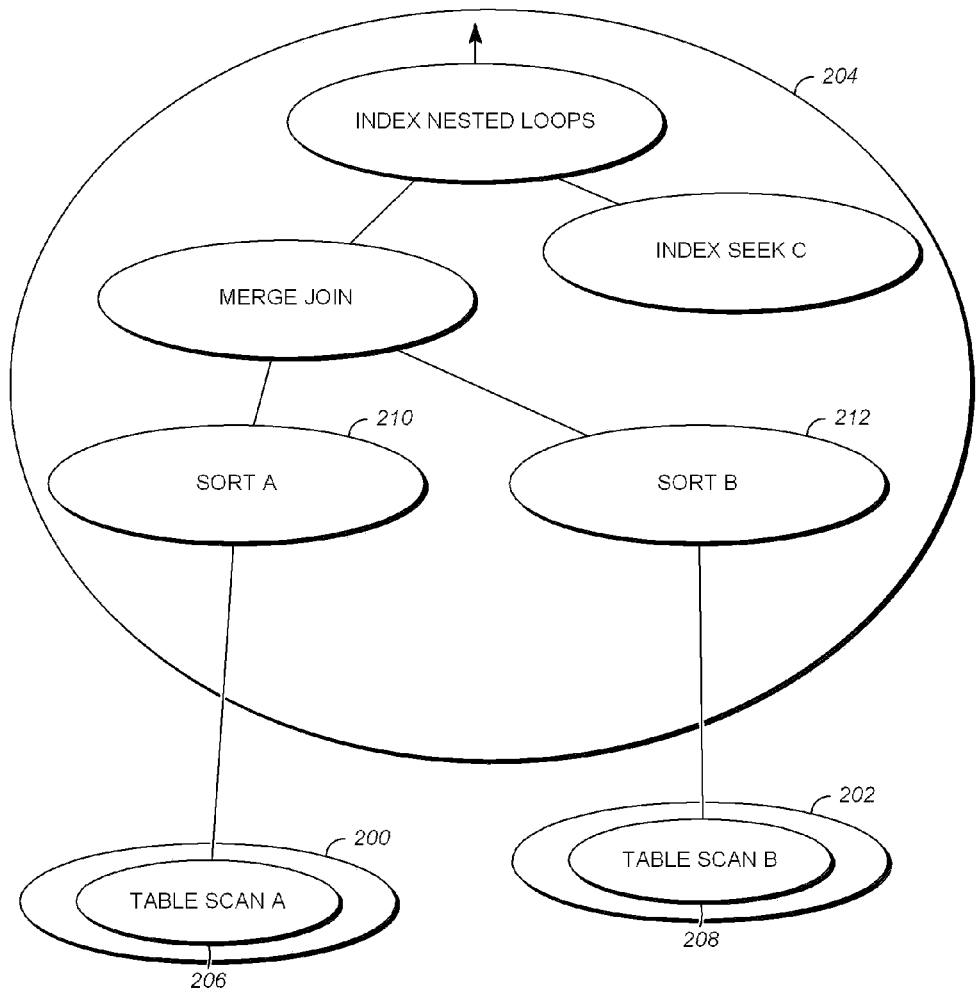
FIG. 9 is an illustration of a query execution plan.

FIG. 9 illustrates the effect of Sort nodes on the progress estimation algorithm. For the query execution plan shown in FIG. 9, the pipelines identified for this query would be {Table Scan A} 200, {Table Scan B} 202 {Sort A, Sort B, Merge Join, Index Nested Loops, Index Seek C} 204 and the driver nodes would be Table Scan A 206, Table Scan B 208, Sort A 210, Sort B 212. Note however, that unlike a Hash Join, for a Sort-Merge Join, the scans of both inputs do need necessarily need to complete for the Sort-Merge Join to complete.

Initializing and Refining Driver Node Cardinalities

Figure 10:
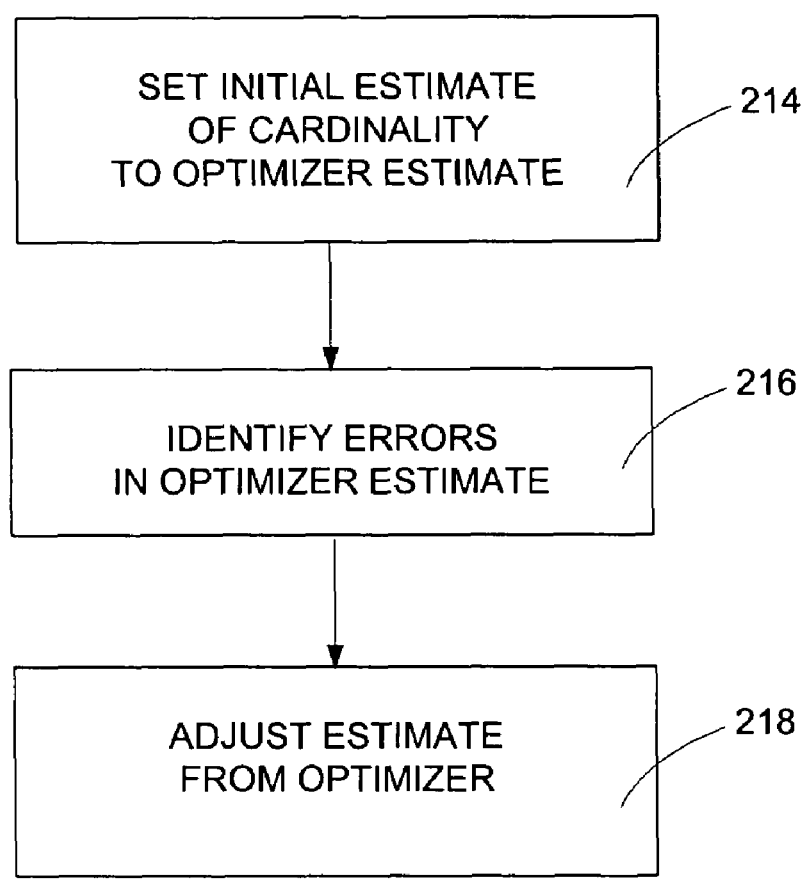
FIG. 10 is a flow chart that illustrates a method of adjusting an optimizer estimate.

For driver nodes that are leaf nodes (e.g. Table/Index Scans) of the query execution tree, a fairly accurate estimate of cardinality can be obtained from the system catalogs prior to the start of execution of the pipeline. Difficulty arises when cardinality estimates are needed for driver nodes of pipelines that start with non-leaf nodes of the query execution tree (e.g., intermediate Sort nodes and Hash based Group-By nodes). In one embodiment illustrated by FIG. 10, the method relies on the query optimizer to estimate 214 the initial cardinality prior to start of query execution. However, these cardinality estimates can be erroneous. In the embodiment illustrated by FIG. 10, the method identifies 216 errors in the initial estimate and adjusts 218 the estimate accordingly.

Figure 11:
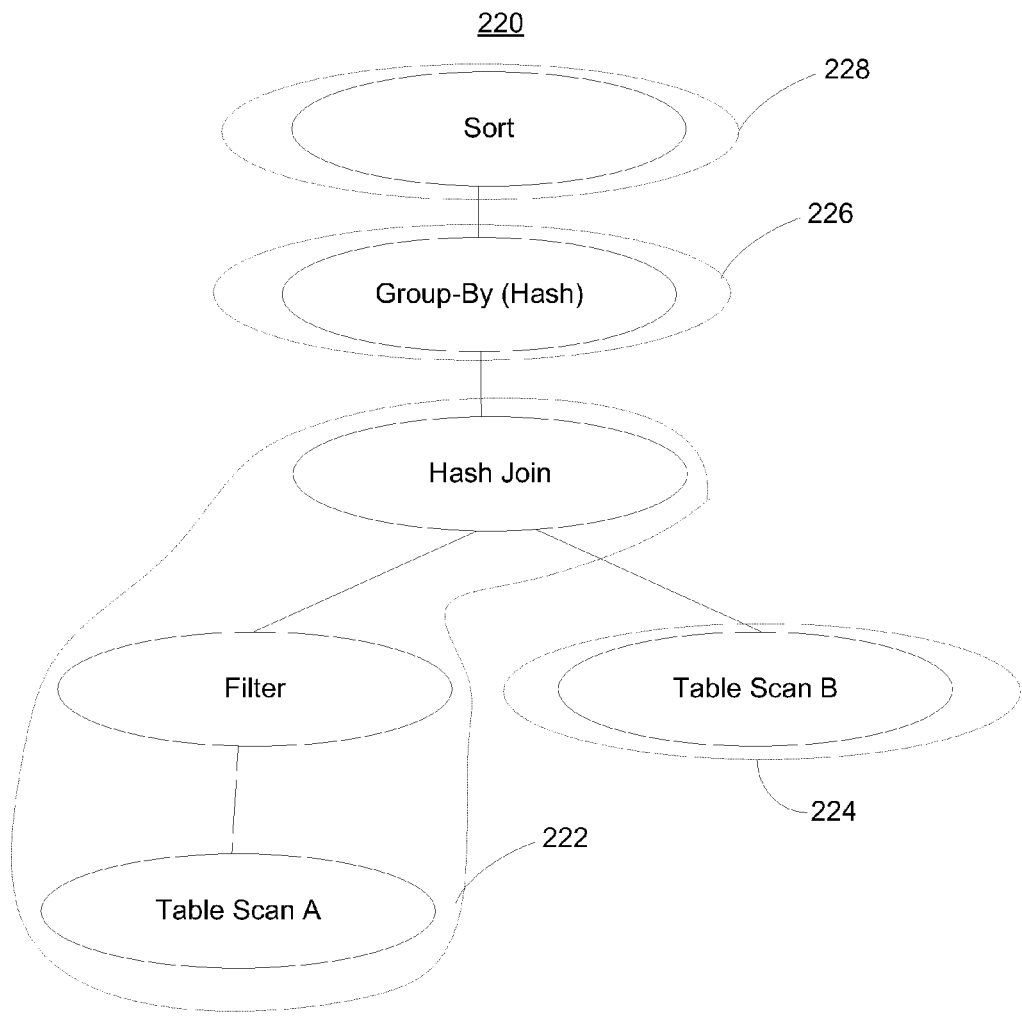
FIG. 11 is an illustration of a query execution plan divided into pipelines.

FIG. 11 illustrates an example of a query execution plan 220. Assuming a hash join is used where A is the build relation and B is the probe relation, the pipelines for the query are {Table Scan A, Filter, Hash Join} 222, {Table Scan B} 224, {Group-By} 226, and {Sort} 228. The driver nodes for the query would include the Sort node. To estimate the cardinality of the Sort operator, the optimizer needs to have accurate estimates on the filter, join and group-by operators. This is the traditional join cardinality estimation problem and distinct value estimation problem for the Group-By operator. As a result, the initial estimate of work done in the Sort 228 could be inaccurate, leading to an inaccurate progress estimation.

In an exemplary embodiment, the initial estimates from the optimizer are refined using feedback obtained during query execution. A variety of techniques may be employed to refine the initial estimates from the optimizer. Cardinality estimates can be refined in different ways, depending on where the feedback information is extracted from. An example of one approach for refining the initial estimates is a conservative approach that ensures that inaccuracies are not introduced by the refinement process. In this embodiment, the current estimate $N_i$ of any node is refined only if it is certain that the refinement will make the estimate more accurate. In one embodiment, this is achieved as follows: For each node in the execution plan, the upper and lower bounds UBi and LBi, on the cardinalities of the rows that can be output from a node i. These lower and upper bounds are adjusted as more information is obtained during query execution. The approach monitors whether the current estimate $N_i$ is greater than or equal to the lower bound LBi and less than or equal to the upper bound UBi,. If it is found that the current estimate Ni lies outside the bounds, then the approach corrects the estimate Ni to a value within the bounds. In one embodiment, the value within the bounds is the value of the bound that was violated by the estimate Ni. In one embodiment, the effectiveness of this refinement is increased by quickly refining the bounds based on execution feedback.

Refining an upper or lower bound for a particular node could potentially help refine the upper or lower bound of other nodes above the refined node in the execution tree. For example, in FIG. 11, suppose that at some point in time T during the query's execution, it is concluded that the upper bound for the Hash Join can be reduced from 1 million rows to 0.5 million rows. Suppose the upper bounds for the Group By and Sort nodes were 0.8 million rows. Then, based on the properties of Group-By and Sort nodes, it can also be concluded that each of their upper bounds cannot exceed 0.5 million rows. The lowering of the upper bound could help refine the estimates Ni at one or both of these nodes at time T. Note that even when estimator PROG uses only the driver node cardinalities for progress estimation, it may be useful to refine cardinalities of all nodes in the plan since these estimates could influence the estimates Ni of the driver nodes above it. In one embodiment, these bounds are propagated up the tree as soon as a change in the bound can be made for some node. In one embodiment, the frequency at which such propagation of refinement is done can be limited to control the overhead imposed by the propagation. For example, the bounds could be propagated a few times per second at roughly the granularity at which feedback is necessary to the user for a given application.

Refining Upper and Lower Bounds

Figure 12:
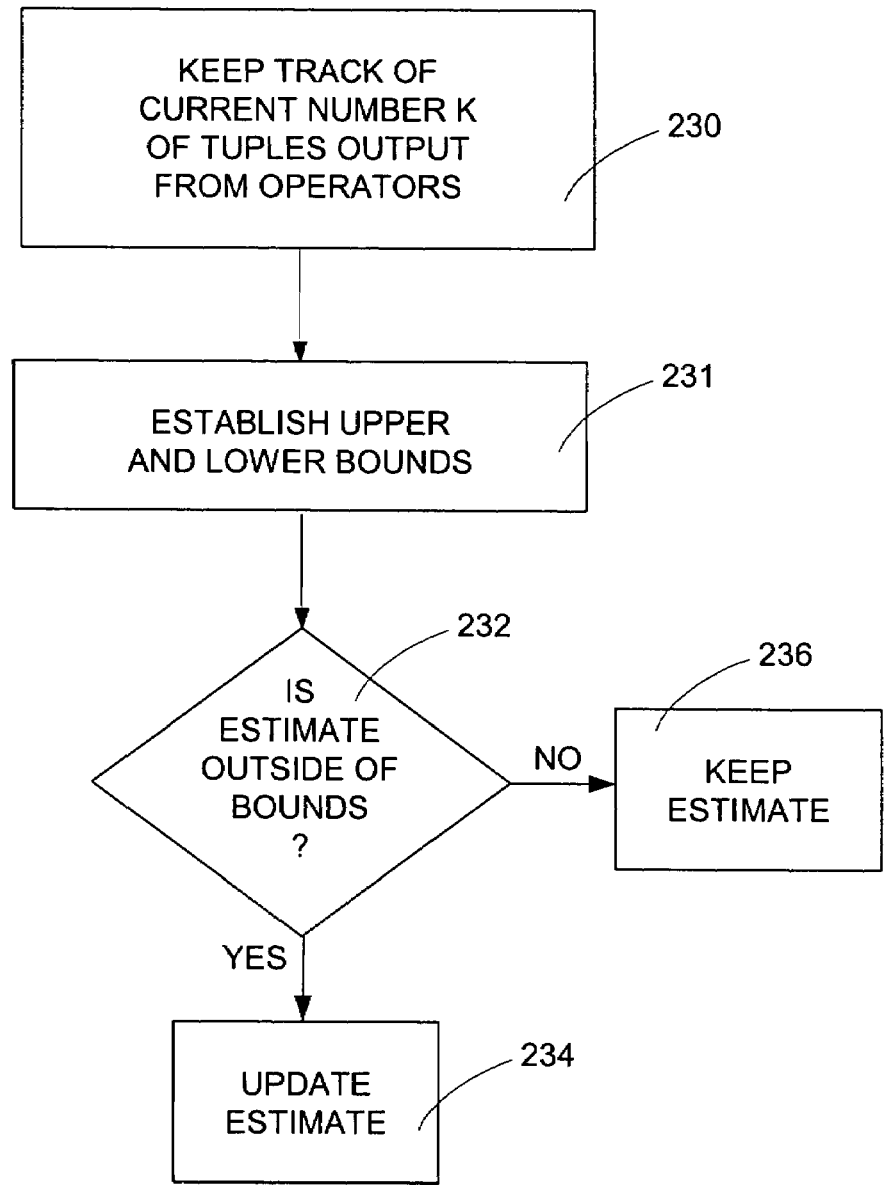
FIG. 12 is a flow chart that illustrates a method of adjusting an optimizer estimate.

FIG. 12 illustrates one method of refining upper and lower bounds. In the embodiment illustrated by FIG. 12, each node in the execution tree is modified to keep track 230 of the current number k of tuples output from the operators. Upper and lower bounds are established 231 using the numbers of tuples output from the operators so far. The refinement determines 232 whether the optimizer estimate is within the bounds. If the current optimizer estimate for the node is outside the bounds, the optimizer is updated 234. If the estimate is within the bounds, the estimate is kept 236. This refinement can be applied to any node in the execution tree. In this embodiment, each node in the execution tree maintains upper bounds and lower bounds of expected cardinality estimates at any point during query execution. The optimizer estimate is refined appropriately if the estimate does not lie within these bounds.

In one embodiment, the lower and upper bounds are initialized for all leaf nodes of the execution plan prior to query execution. Note that for Table and Index Scan nodes (leaf nodes), both the lower and upper bounds are typically exact and equal to the cardinality of the table (or index). These values can be obtained from system catalogs. The bounds can then be propagated to other nodes in the tree in a bottom up manner using operator specific propagation rules. Table 1, provides examples of propagation rules for refining upper and lower cardinality bounds that can be used for some common physical operators. In Table 1, Ki is the actual number of rows output from the operator thus far, UBi is the upper bound on the number of rows that can be output from the operator and LBi is the lower bound on the number of rows that can be output from the operator. These rules can be extended to include other physical operators. Once query execution begins, depending on the specific operator being executed, if a change in either lower or upper bound is possible for that operator, the bounds are updated for that operator. These bounds can be propagated up the execution plan tree at regular intervals.

TABLE 1

| Physical Operator i | Lower Bound ($Lb_i$) | Upper Bound ($UB_i$) |
|---|---|---|
| Filter | $K_i$ | $(UB_{i-1} - K_{i-1}) + K_i$ |
| Group By | D (# distinct values observed thus far) | $(UB_{i-1} - K_{i-1}) + d$ |
| Sort | $K_{i-1}$ | $UB_{i-1}$ |
| Nested Loop Join (Foreign Key) | $K_i$ | $(UB_{i-1} - K_{i-1}) + K_i$ i − 1 refers to Outer Relation |
| Nested Loop Join (Not FK) | $K_i$ | $(UB_{i-1} - K_{i-1}) \cdot UB_{i-2} + K_i$ i − 2 refers to Inner Relation |
| Hash Join (Not FK) | $K_i$ | $(UB_{i-1} - K_{i-1}) \cdot S$ S is # of rows of largest build partition |
| Table/Index Scan (table T) | $|T|$ (# of rows in table) | $|T|$ |
| Index Seek (table T) | $K_i$ | $|T|$ |

Note that for implementing the rules for certain operators such as Filter, Sort, NL Join (foreign-key) and Index Seek shown in Table 1, the refinement can be done completely at the iterator level. That is, the refinement can be performed without knowledge of how the operator is implemented. In other cases, refinement requires knowledge of how the operator is implemented. For the Group By operator which is blocking, if the number of distinct values d observed during the operator's execution thus far can be counted, then the lower bound can be refined to the number of distinct values d at that point in time. As another example of an operator specific refinement, consider a Hash Join between two relations A (build side) and B (probe side). Assume A has already been hashed into buckets, and suppose S is the number of tuples of the largest bucket. This information can be exploited during the probe phase to obtain a tighter upper bound since it is known that each row from relation B can produce at most S tuples after the join. Thus, by instrumenting operator specific data structures, refinement can be provided for operators like Hash Join and Group-By.

In some cases the operator Opi is a Sort operator, which is blocking, and thus starts a new pipeline. In this case, the input to operator Opi would have been consumed while the previous pipeline, involving operator Opi-1, was executing. In this case, when operator Opi starts running, exact cardinality estimates are known for the operator's Opi input. The cardinality of the operator's Opi input is the same as its output, and does not need to be refined further. In one embodiment, the bounds of operator Opi can be refined while the previous operator Opi-1 is running by using the rule in Table 1. It is noted that:

(a) Whenever an operator terminates, the upper and lower bounds of that operator are known exactly for the operator and can be propagated to other nodes.

(b) Referential integrity constraints that may apply to some nodes (e.g., foreign key constraint applying to a join) can be leveraged to obtain tighter bounds.

Monotonicity of Progress Bar

A progress bar that is monotonically increasing is one where the percentage done does not decrease over time. Monotonicity is a desirable property from a user interface perspective. The ideal estimator I has perfect information of the values $N_i$ and can therefore guarantee monotonicity. However, other techniques can only estimate the values $N_i$ for the driver nodes and hence has to work with uncertainties. For example, the optimizer estimates could be wrong or there could be many runtime factors that cannot be predicted. However, there are conditions under which the disclosed progress estimator can guarantee that the estimates are always increasing with time.

A first class of queries where estimator PROG is monotonic is the class of queries where all the driver nodes are table scans or index scans of the execution plan. Since the corresponding values Ni used in the denominator are exact values, the values Ni are guaranteed never to increase. Since the numerator can only increase over time, the estimator PROG is guaranteed to be non-decreasing. For example, the class of queries that can be evaluated using only a pipeline of hash joins would have this property, since none of the intermediate nodes in the plan are driver nodes.

Estimator PROG may be monotonic even though one or more intermediate nodes in the execution plan is a driver node. A second class of queries where estimator PROG is monotonic is the class of queries where the estimated cardinalities Ni for the driver nodes are overestimates of the actual cardinality Ni for the nodes. When each estimated cardinality is an overestimate, estimator PROG will be monotonic.

Another case where estimator PROG is monotonic is when there are two pipelines P1, P2 and pipeline P1 feeds into pipeline P2. Pipeline P1 has a Table/Index Scan as the driver node and pipeline P2 has a Sort node as the driver node. If pipeline P1 has the property that each row coming out of its driver node can result in at most one row feeding into the Sort node, then estimator PROG will be monotonic.

While monotonocity is desirable, it is noted that there is a trade-off between ensuring monotonicity and the accuracy of progress estimation. When the estimated value Ni is an underestimate of the actual value Ni, the progress estimation can become non-monotonic. However, when estimated value Ni is an overestimate of the actual value Ni, monotonicity is not violated. In particular, if the estimated Ni is an upper-bound of the actual value Ni for each node, then monotonicity can be guaranteed. However, it is difficult to find tight upper-bounds so that accuracy of the estimator is not significantly compromised. For example, consider a query plan which performs a hash join of relations R1 and R2 and then sorts the result of the join. The upper-bounds for the scans for R1 and R2 (which are driver nodes) are tight, because the number of rows that will be scanned from each relation is known. However, obtaining a tight upper-bound on the estimate of the Sort node cardinality can be problematic. If the join is a foreign key join, it is known that an upper bound on the cardinality of the joined relation, and hence the Sort node, is the size of table with the foreign-key. Thus, this upper-bound can be used as the estimated value Ni for the Sort node and thereby guarantee monotonicity. However, if the upper-bound is a considerable overestimate of the actual value Ni for the Sort node, the accuracy of the estimator may be poor until most of the query has completed executing.

A user may prefer progress estimates that are more accurate or may prefer progress estimates that are guaranteed to be monotonic. In one embodiment, both the estimated progress and the progress based on the upper-bounds (monotonic) are presented to the user. Progress computed using upper bounds is denoted as p1% and the corresponding progress estimate computed using estimates is denoted p2%. The percent done at any instant is not lower than value p1% and the current estimate is the value p2%. Note that value p1% is monotonic, whereas p2% may not be monotonic.

Effect of Runtime Conditions

The disclosed method models the query as a set of pipelines and approximates each pipeline as a scan of one or more 'driver' nodes. If the cardinality of the driver nodes are $N_i$, the estimator models the total work to be done as $\Sigma_i N_i$. In one embodiment, the disclosed estimator makes the following assumptions:

(1) All pipelines and their driver nodes can be computed before the query starts execution.

(2) Each pipeline executes at approximately the same rate (i.e., the work done per tuple in each pipeline is approximately the same). Hence the $\Sigma_i N_i$ is valid measure of work.

In this section, the impact on the accuracy of the estimator when these assumptions do not hold is discussed. In an exemplary embodiment, the estimator PROG is extended to handle such runtime effects.

Spills

Spills of tuples to disk can occur as a result of insufficient memory and result in more work. As an example, consider a join between two relations A and B, where the optimizer picks a hybrid hash join operator. Hybrid hash proceeds by building a hash table of A in memory. During the scan of relation A, if the memory budget of the hash join is exhausted, then certain buckets will be spilled to disk. When table B is used to probe the hash partitions, the tuples of B that hash to the buckets that are not memory resident are also written to disk. Bucket spilling is a runtime occurrence and hence one cannot predict the number of tuples that will be spilled to disk in advance.

Query execution is modeled as comprising two parts to account for spills in one embodiment. One part processes the original relations and the other part processes the spilled partitions. The original query can be modeled as follows: Q=(A join B)∪(A' join B') where A' and B' denote the corresponding parts of relations A and B that have been spilled (0≦|A'|≦|A|, 0≦|B'|≦|B|). The driver nodes for query Q would include scans of A, B, A' and B'. Thus the total work for Q would be |A|+|B|+|A'|+|B'|. One complication is that spilled portions |A'|, |B'| cannot be predicted at optimization time. The work (A' join B') could be sizable. For instance, consider the point of execution when the first phase of hash execution is over and none of the spilled partitions have been processed. At this point an estimator that ignores spills would estimate progress of (|A|+|B|/|A|+|B|) or 100%, irrespective of the fraction of relations that have been spilled. Another possibility is to assume the worst case and predict that |A'|=|A| and |B'|=|B|. Consider the case where there is sufficient memory to process the join (there are no hash spills), in this case until the hash phase is over, the estimator would always be off by a factor of 2. Thus, both these solutions are unsatisfactory.

In an exemplary embodiment, the disclosed method deals with spills as follows. Whenever a tuple is spilled to disk (either from relation A or B) the denominator value (which denotes the total work) is incremented by one. That is, spilling to disk adds more unit of work to be done later and the denominator value is modified (increased) to reflect the expected cardinality of the driver nodes of those pipelines.

Consider the point of execution where the first phase of hash processing is over and none of the spilled partitions have been processed. The modified estimator has incremented the denominator counter for each tuple that had been spilled and would estimate the progress as (|A|+|B|)/(|A|+|B|+|A'|+|B'|) which is correct as it accounts for the remaining tuples to be processed. When the spilled partitions are re-read the corresponding counts would be counted in the numerator and only when all the partitions have been processed will the estimator report the progress as 100%. This correction to the estimator works because of the symmetry of spills, i.e., exactly the same number of tuples that have been written to disk will be processed later. This modification to the original algorithm can be used for multiple recursion levels in a hash join pipeline.

Spills could occur in other operators like hash-based Group-By or the merge phase in a Sort-Merge join if there are too many duplicates of a particular value. In general, a query can be considered as Q∪Q' where Q' accounts for the work done by the current query in handling data that is spilled. The estimator starts with the driver node counts for only Q, as query execution proceeds it keeps track of the work to be performed on Q' by incrementing the total work suitably whenever any tuple is spilled to disk from any operator from the query.

Non-Uniform Execution Rates Across Pipelines

In one embodiment weights C are assigned to pipelines to account for non-uniform execution rates of pipelines that make up the query. In the embodiment, described above, an assumption of the estimator PROG was that all pipelines of the query execute at approximately the same rate. When this is the case, the sum of the expected cardinalities of the driver nodes is an accurate measure of work. But in certain cases, pipelines within the same execution plan could have widely varying execution rates. This could occur for the following reasons:

(1) The number of operators could widely vary between pipelines.

(2) Certain pipelines could have more expensive operators.

(3) The portion of data touched by a particular pipeline could be read from a much slower disk or could be read entirely from the buffer pool, which could change the rate of execution drastically.

To deal with this problem, the PROG estimator is extended as follows in one embodiment. In this embodiment, let the cardinality estimates for the d driver nodes in the execution plan be $N_i$ (i=1 ... d). Let $C_i$ denote the relative per-tuple work of each pipeline. Then the progress would be reported as:

$$PROG = \frac{\sum_i C_i \cdot K_i}{\sum_i C_i \cdot N_i}$$

In the case where all pipelines proceed at the same rate (i.e. $C_i$=1) the estimator PROG is unchanged. One complication is that the relative per-tuple work $C_i$ values are not known until execution time. In one embodiment, the method starts with uniform relative rates (i.e. $C_i$=1 for all i) and adjusts the relative weights based on execution feedback. That is, the per-tuple cost Ci for each pipeline is adjusted as execution proceeds.

Leveraged Technology

Two existing technologies are leveraged to estimate query progress in an exemplary embodiment. The first technology is estimating cardinality of query expressions. Selectivity estimation and distinct value estimation enable query optimizers to pick a suitable query execution plan. In the exemplary embodiment, the estimator leverages cardinality estimation techniques used by the query optimizer to provide an initial estimates of cardinality of driver nodes in a pipeline.

The second technology is the use of information gathered during query execution. In an exemplary embodiment, the progress estimator uses observed cardinality of operators in the execution tree to improve estimate of total work that needs to be done, while leaving the query execution plan unchanged. A second use of such information is to improve selectivity estimation of subsequent queries.

In an exemplary embodiment, a progress bar is provided for arbitrary queries, such as arbitrary SQL queries. Providing a progress bar for arbitrary requires the total work required to execute a query to be accurately estimated. Queries in modern database systems are quite complex involving joins, nested sub-queries and aggregation. In the exemplary embodiments, the model of work used is not completely independent of the intermediate cardinalities of join, nested sub-query and aggregation operators, because a measure of work that is independent of such operators is likely to be too simplistic. For instance, a progress estimator that reports what fraction of nodes in the execution tree that have completed would be too simplistic. If a query is just a single pipeline of operators, for almost the entire duration of the execution of the query, all the operators are active. Thus, this strategy that bases the progress on number of operators that have completed, will not report any progress until near the very end of query execution.

In an exemplary embodiment, the method deals with blocking operators. Assuming that an optimizer can predict the number of query results accurately at the start of query execution, a progress estimator that reports the fraction of query results that have been returned could still be very inaccurate. For example, in a pipeline of a number N of hash joins (which are blocking), the query results are not computed until the probe phase of the last hash join starts. Therefore, until that time, a progress estimator that reports the fraction of query results that have been returned would not report any progress irrespective of the number of joins executed.

The method illustrated by FIG. 6 is based on the observation that any query execution plan can be viewed as a set of pipelines. Each pipeline can be approximated as a scan of one or more 'driver' nodes. By monitoring what percentage of the work done at each driver node is complete, the disclosed method can estimate the overall progress of the query during execution.

The disclosed methods use a model for the total work done by a long running query and uses an estimator for the percentage of the query's work that has completed. This functionality is useful in today's database systems. One advantage of the disclosed progress estimation methods is that they are easy to implement in typical query processing engines that follow the iterator model. Another benefit of the disclosed progress estimation methods is that they are applicable to general SQL since the method deals with the execution plan level.

Exemplary Operating Environment

Figure 13:
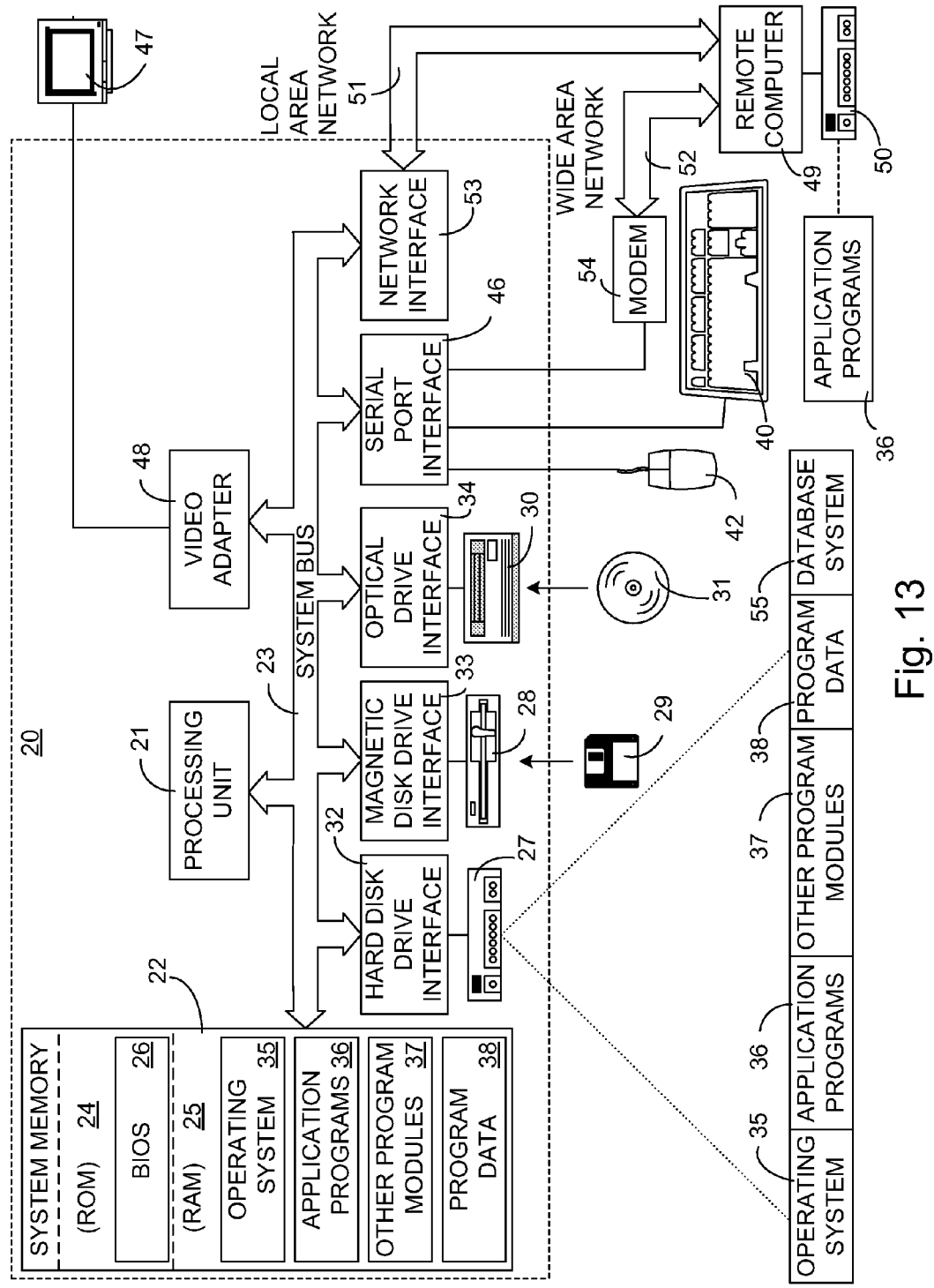
FIG. 13 is a schematic depiction of a computer system used in practicing an exemplary embodiment of the disclosed method.

FIG. 13 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 13, an exemplary system for implementing the invention includes a general purpose computing device in the form of a conventional personal computer 20, including a processing unit 21, a system memory 22, and a system bus 24 that couples various system components including system memory 22 to processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system (BIOS) 26, containing the basic routines that help to transfer information between elements within personal computer 20, such as during start-up, is stored in ROM 24. Personal computer 20 further includes a hard disk drive 27 for reading from and writing to a hard disk, a magnetic disk drive 28 for reading from or writing to a removable magnetic disk 29 and an optical disk drive 30 for reading from or writing to a removable optical disk 31 such as a CD ROM or other optical media. Hard disk drive 27, magnetic disk drive 28, and optical disk drive 30 are connected to system bus 23 by a hard disk drive interface 32, a magnetic disk drive interface 33, and an optical drive interface 34, respectively. The drives and their associated computer-readable media provide nonvolatile storage of computer-readable instructions, data structures, program modules and other data for personal computer 20. Although the exemplary environment described herein employs a hard disk 27, a removable magnetic disk 29 and a removable optical disk 31, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk 27, magnetic disk 29, optical disk 31, ROM 24 or RAM 25, including an operating system 35, one or more application programs 36, other program modules 37, and program data 38. A database system 55 may also be stored on the hard disk, magnetic disk 29, optical disk 31, ROM 24 or RAM 25. A user may enter commands and information into personal computer 20 through input devices such as a keyboard 40 and pointing device 42. Other input devices may include a microphone, joystick, game pad, satellite dish, scanner, or the like. These and other input devices are often connected to processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as a video adapter 48. In addition to the monitor, personal computers typically include other peripheral output devices such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to personal computer 20, although only a memory storage device 50 has been illustrated in FIG. 13. The logical connections depicted in FIG. 13 include local area network (LAN) 51 and a widearea network (WAN) 52. Such networking environments are commonplace in offices, enterprise-wide computer networks, intranets, and the Internet.

When using a LAN networking environment, personal computer 20 is connected to local network 51 through a network interface or adapter 53. When used in a WAN networking environment, personal computer 20 typically includes a modem 54 or other devices for establishing communication over wide area network 52, such as the Internet. Modem 54, which may be internal or external, is connected to system bus 23 via serial port interface 46. In a networked environment, program modules depicted relative to personal computer 20, or portions thereof, may be stored in remote memory storage device 50. It will be appreciated that the network connections shown are exemplary and other ways of establishing a communications link between the computers may be used.

What is claimed is:

1. A method of estimating query progress, comprising:
   receiving a query;
   based on characteristics of the received query, determining a model of work to be performed during execution of the query;
   estimating a total amount of work that will be performed according to the model;
   iteratively estimating an amount of work performed according to the model at a given point during the execution of the query;
   iteratively estimating the progress of the query using the estimated amount of work performed and the estimated total amount of work;
   iteratively displaying estimated progress of the query to a user; and
   preventing decreasing progress estimations from being displayed to the user by using an upper bound on the total work that will be performed as an estimate of the total work that will be performed.

2. The method of claim 1 further comprising identifying a spill of tuples during query execution and adjusting the model of work to account for additional work that results from the spill of tuples.

3. The method of claim 1 further comprising updating an estimated total amount of work that will be performed during query execution.

4. The method of claim 1 wherein an estimated amount of work performed according to the model is updated at a plurality of points during query execution.

5. Computer readable storage media comprising computer-executable instructions for performing the method of claim 1.

6. The method of claim 1 wherein work performed during execution of a query is modeled as a number of items returned by a query operator.

7. The method of claim 1 wherein work performed during execution of a query is modeled as a number of GetNext( ) calls by a query operator.

8. The method of claim 1 wherein the work performed during execution of the query is modeled as work performed by a driver node operator during execution of the query.

9. The method of claim 1 wherein work performed by a driver node operator is modeled as a number of items returned by the driver node operator.

10. The method of claim 1 wherein work performed by a driver node operator is modeled as a number of GetNext( ) calls by a driver node operator.

11. The method of claim 1 further comprising dividing a query execution plan into a set of pipelines and estimating the progress of each pipeline.

12. The method of claim 11 wherein the pipelines comprise sequences of non-blocking operators.

13. The method of claim 11 further comprising combining progress estimates for the pipelines to estimate the progress of the query.

14. The method of claim 13 further comprising assigning weights to the pipelines.

15. The method of claim 14 wherein the weights are based on relative execution rates of the pipelines.

16. The method of claim 11 further comprising initializing an estimate of the total amount of work that will be performed by a pipeline with an estimate from a query optimizer.

17. The method of claim 11 further comprising identifying driver node operators of the pipeline and modeling the work performed during execution of the pipelines as work performed by the driver node operators.

18. The method of claim 11 further comprising modeling the work performed during execution of the pipelines as work performed by all operators in the pipeline.

19. The method of claim 11 further comprising identifying driver node operators of the pipeline and using information about the driver node operators obtained during execution to estimate a total amount of work that will be performed by all operators in the pipeline.

20. The method of claim 1 further comprising refining the initial estimate of the total work using feedback obtained during query execution.

21. The method of claim 1 further comprising preventing decreasing progress estimations from being displayed to the user.

22. A method of estimating query progress, comprising:
   receiving a query;
   based on characteristics of the received query, determining a model of work to be performed during execution of the query;
   estimating a total amount of work that will be performed according to the model;
   iteratively estimating an amount of work performed according to the model at a given point during the execution of the query;
   iteratively estimating the progress of the query using the estimated amount of work performed and the estimated total amount of work;
   iteratively displaying estimated progress of the query to a user;
   preventing decreasing progress estimations from being displayed to the user; by
   maintaining an upper bound and a lower bound on the on the total amount of work that will be performed and modifying an estimated total amount of work that will be performed when the estimated total amount of work that will be performed is outside a range defined by the upper bound and the lower bound.

23. The method of claim 22, wherein the amount of work performed during execution of a query is modeled as a number of items returned by a query operator, and further comprising modifying an estimated total number of items that will be returned by the query operator when the estimated total number of items that will be returned by the query operator is outside a range defined by the upper bound and the lower bound.

24. The method of claim 23 wherein a rule used for maintaining a bound on the total number of items that will be returned by the query operator is specific to the query operator.

25. The method of claim 24 wherein the query operator is a Group By operator and the rule used for maintaining an upper bound on a number of groups that will be returned by the Group By operator comprises subtracting a number of items returned by an immediately preceding operator in a query execution plan from an upper bound of the immediately preceding operator and adding a number of distinct values observed by the Group By operator.

26. The method of claim 24 wherein the query operator is a Hash Join operator and the rule used for maintaining an upper bound on the number of rows that will be returned by the Hash Join operator comprises subtracting a number of items returned by an immediately preceding operator in a query execution plan from an upper bound of the immediately preceding operator and multiplying a number of rows of a largest build partition.

27. The method of claim 23 further comprising setting the lower bound to a number of items returned by the query operator at a given point during query execution.

28. The method of claim 23 wherein the upper bound of the query operator is maintained using an upper bound of one or more preceding query operators in a query execution plan.

29. The method of claim 28 wherein the upper bound of the query operator is maintained using an upper bound of an immediately preceding query operator in the query execution plan.

30. The method of claim 23 wherein the upper bound of the query operator is maintained using a number of items returned by one or more preceding operators in a query execution plan at a given point during query execution.

31. The method of claim 30 wherein the upper bound of the query operator is maintained using a number of items returned by an immediately preceding query operator in the query execution plan.

32. The method of claim 23 wherein the upper bound of the query operator is maintained using a number of items returned by the query operator at a given point during query execution.

33. The method of claim 23 wherein upper and lower bounds are maintained for a plurality of query operators in a query execution plan and wherein a changes in bounds of query operators are periodically propagated to other query operators in the query execution plan.

34. In a computer system including a display, a user input facility, and an application for presenting a user interface on the display, a user interface comprising:
    a query progress indicator that estimates progress based on:
        an estimated amount of work performed at a given point during execution of the query according to an execution plan generated in response to a received query;
        an estimated total amount of work to be performed according to the execution plan, wherein the execution plan defines work to be performed during execution of the query;
    a query end selector that allows the user to abort execution of the query; and
    a tuple spill indicator that alerts a user when tuples spill to disk during query execution.

35. The user interface of claim 34 wherein the query progress indicator provides a visual indication of a percentage of query execution that has been completed.

36. The user interface of claim 35 wherein the percentage of query execution that has been completed is estimated by dividing a number of tuples returned by the query by an estimated total number of tuples to be returned by the query.

37. The user interface of claim 35 wherein the percentage of query execution that has been completed is estimated by dividing a number of tuples returned by an operator by an estimated total number of tuples to be returned by the operator.

38. The user interface of claim 35 wherein the percentage of query execution that has been completed is estimated by dividing a GetNext( ) calls by a query operator by an estimated total number of GetNext( ) calls by the operator.

39. The user interface of claim 35 further comprising initializing the estimated total number of GetNext( ) calls with an estimate from a query optimizer.

40. The user interface of claim 39 wherein initial estimate of the total number of GetNext( ) calls is updated using feedback obtained during query execution.

41. The user interface of claim 34 the query progress indicator is prevented from providing an indication of decreasing query progress.

42. A system for providing an indication of query progress, comprising:
    a user input device enabling a user to begin execution of a query and abort execution of a query;
    a display;
    a data content that queries can be executed upon;
    a memory in which machine instructions are stored;
    a processor that is coupled to the user input device, to the display, to the data content, and to the memory, the processor executing the machine instructions to carry out a plurality of functions, including:
        receiving a query;
        generating an execution plan in response to the received query;
        selecting a model of work corresponding to the execution plan;
        executing the query upon the data content;
        estimating progress of the query using the selected model of work; and
        providing an indicator of query progress on the display;
        identifying a spill of tuples during query execution and provides an indication of the spill on the display.

43. The system of claim 42 the indicator of query progress provides a visual indication of a percentage of query execution that has been completed.

* * * * *